United States Patent [19]

Mortenson

[11] Patent Number: 4,478,685
[45] Date of Patent: Oct. 23, 1984

[54] PACKED COLUMN DISTILLATION APPARATUS

[76] Inventor: C. Walter Mortenson, 1175 Pleasant Hill Rd., Newark, Del. 19711

[21] Appl. No.: 320,198

[22] Filed: Nov. 12, 1981

Related U.S. Application Data

[62] Division of Ser. No. 110,636, Jan. 9, 1980, Pat. No. 4,326,923.

[51] Int. Cl.³ .......................... B01D 3/16; C02F 1/14
[52] U.S. Cl. .................................... 202/158; 202/163; 202/178; 202/191; 202/234; 202/267 R; 203/10; 203/86; 203/DIG 1; 261/99; 261/DIG. 72
[58] Field of Search .............. 203/10, 11, 86, DIG. 1; 261/DIG. 72, 114 R, 110, 99, 107, 94; 202/234, 163, 158, 176, 159, 178, 267, 191; 159/DIG. 27, DIG. 28, 1 S, 1 SF

[56] References Cited

U.S. PATENT DOCUMENTS

| | | | |
|---|---|---|---|
| 2,271,671 | 2/1942 | Wible | 261/DIG. 72 |
| 2,820,744 | 1/1958 | Lighter | 159/1 SF |
| 3,483,091 | 12/1969 | Metzger et al. | 203/86 |
| 3,785,931 | 1/1974 | Coffey et al. | 202/234 |
| 3,875,926 | 4/1975 | Frank | 202/234 |
| 4,118,285 | 10/1978 | Yeh | 203/86 |
| 4,326,923 | 4/1982 | Mortenson | 202/234 |

Primary Examiner—Wilbur L. Bascomb, Jr.

[57] ABSTRACT

Apparatus is provided for converting sea or other undrinkable waters to drinkable water without the use of driven or moving parts. Reliance upon gradient effects is made to effect the vaporization of, for example, sea water, followed by the condensation of the vapor to form distilled water. Gradient effects are achieved through the provision of differentials in the thermal conductivity, capillary activity, adsorptive, absorptive and/or pressure characteristics of particulate materials, or combinations of such physicals. For example, a column is packed with material graded as to its conductivity, the least thermally conductive material being nearest the cold or ambient water that is to be purified. In packing the column each successive layer of material has a greater thermal conductivity than the layer beneath it with the most conductive being at the top near the outlet arm of the column. The final outlet arm or tube is unheated or is at a temperature lower than that of the topmost conductive material so that vapor reaching the outlet tube gets condensed. This tube leads to a container kept in a cool place as, for example, buried in the ground, as, for instance, at the seashore deep enough to be cooled or to be surrounded by water, thus keeping the condensate cold. Pure water so collected is removed by such means as is desired. Other impure, volatile liquids may be similarly purified.

3 Claims, 3 Drawing Figures

U.S. Patent    Oct. 23, 1984    4,478,685
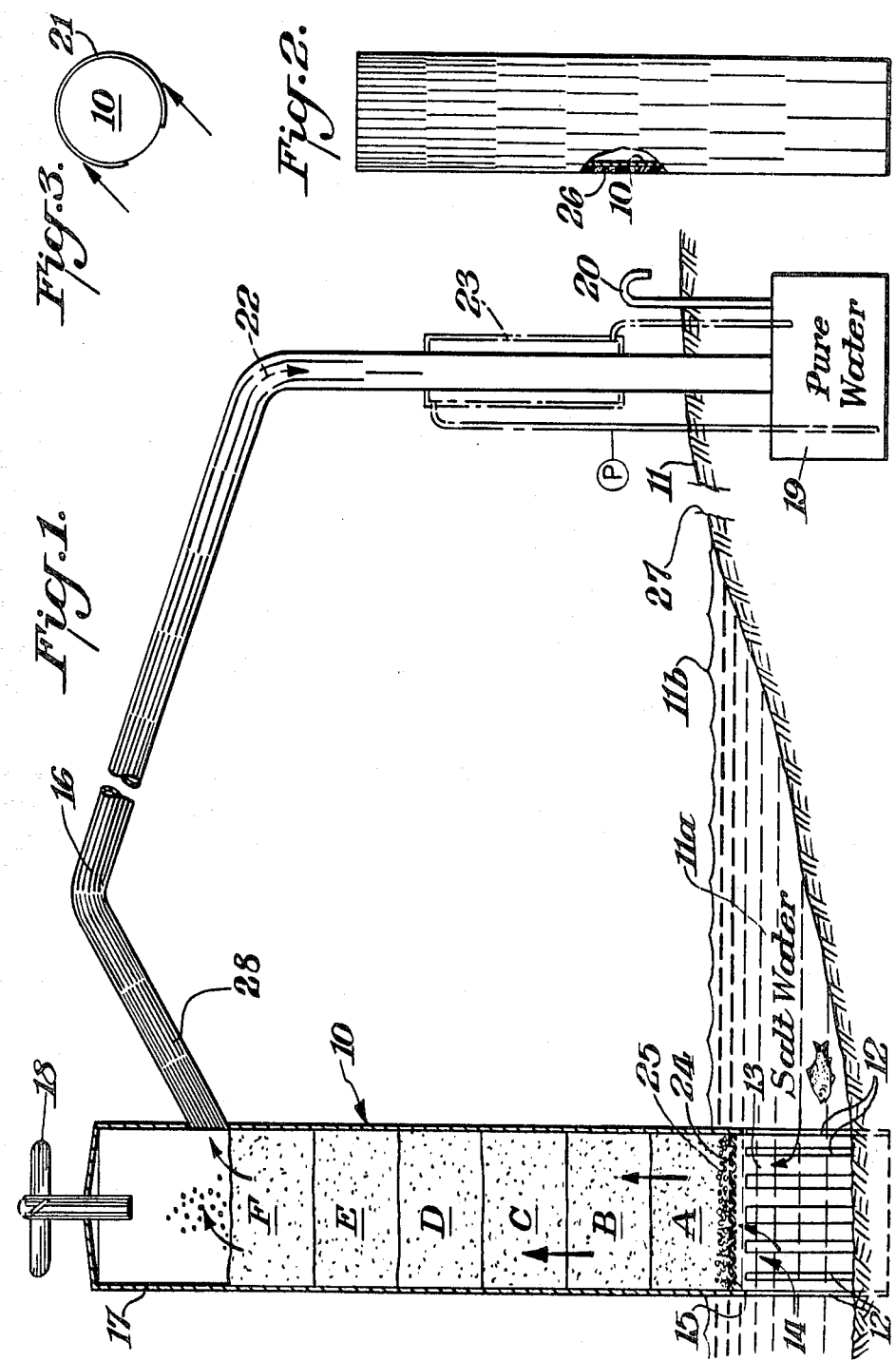

PACKED COLUMN DISTILLATION APPARATUS

This is a division of my application Ser. No. 110,636, filed Jan. 9, 1980 and now U.S. Pat. No. 4,326,923.

BACKGROUND OF THE INVENTION

The energy sources of the world are currently not being adequately directed to the urgent need for many peoples of the world to have decent water and ample supplies of it. Further, there is considerable concern as to the quantities of fuels and the effect on the world and its creatures through the use of the fuels. Therefore, there is a resurgence of interest in the use of solar energy. As a result many publications are issuing. Among these dealing with the production of potable water are the following U.S. Pat. Nos.: 4,078,975; 4,075,063; 4,062,735; 4,053,368; 4,010,080; 3,785,931; 3,428,529; 3,414,481; 3,359,183; 3,357,917; 3,357,898; 3,351,538; 3,338,797; 3,300,393; and 3,135,466. An examination of the prior art will reveal a considerable diversity in approaches. Quite a number use moving parts or require energy other than solar energy. While there are a number of devices that use no moving elements, it is believed that hithertofore no one has applied gradient effects to produce a vapor and reverse gradient effects to condense it to the liquid state in the manner of this invention.

It is, thus, an objective of this invention to effect the distillation of water from a non-potable or other source to produce a distilled water which is potable. Another aim is to effect an increase gradually in the temperature of a liquid or in its purity, to the point where one pure liquid vaporizes or advances and then gradually to reduce its temperature to the point where vapor becomes or is maintained as liquid. A still further purpose is to effect the aforesaid changes by using materials varying in their thermal conductivity and/or varying in their capillary effects. These other objectives of this invention appear hereinafter.

BRIEF DESCRIPTION OF THE INVENTION

The above objects are accomplished, for example, by the provision of a column which is packed with a variety of materials each of which is chosen to have a greater thermal conductivity than the adjacent material below it. Since the column is placed at its inlet end in contact with the liquid to be purified and that liquid is normally at ambient temperatures, the first material placed in the column is a material which is a poor conductor of heat. In the case of converting salt water, such as ocean water, to potable water, that material is normally sand. Above it may be placed a mixture of sand and a heat conductor such as powdered copper with the mixture being mostly sand. Above that layer is placed a similar mixture having less sand and more metal, as, for example, a 60/40 mixture of sand/metal. That is followed successively by a 50/50, then a 40/60 and the like, the top-most layer being 100% metal in particulate form.

It is to be understood that the materials are placed in a tubular or the like, elongated container which is equipped with a side arm for conveying condensate to a receptacle. The container may be unitary or constructed of segments. In its unitary form, it is covered with heat absorbent materials which vary in their thermal conductivity in a similar manner as the particulate materials within the container. Thus, the covering materials are better and better heat conducting elements as one goes from the inlet or bottom of the elongated container toward its outlet or top. If made of segments, the same is true, the bottommost section being a poor conductor of heat, being made, for example, of a synthetic polymer or concrete and the topmost being metallic.

In order to keep the condensate in liquid form and to facilitate condensation, the side arm or condensing part of the distillation apparatus is constructed entirely of a poor thermal conductor or is covered or segmented to produce a gradient in thermal conductivity going from excellent conductivity in the area where the side arm is joined to the elongated column to poor thermal conductivity where the sidearm delivers the condensate to the receptacle. Such a vessel is normally made of a thermal non-conductor and can be buried in the ground. An outlet in it and a pumping element afford removal of the condensate.

The invention will be further understood by reference to the drawings and the detailed description below, all of which is given for illustrative purposes only and is not limitative. The drawings are as follows:

FIG. 1 is a sectioned view of the distilling column illustrating the aforesaid gradients in the elongated column;

FIG. 2 is a front elevation showing the column covered with insulation and showing the gradation of light absorption effected by shading to no or a very slight extent upwardly to a heavily darkened exterior; and FIG. 3 taken on 3—3 of FIG. 1, is a cross-section of the column showing an additional embodiment for effecting conductance of heat to the back side of the column that is not exposed to solar energy.

DETAILED DESCRIPTION OF THE INVENTION

As shown in FIG. 1, an elongated container 10 is placed directly in the liquid to be distilled, such as the designated salt water 11a adjacent to land 11. The outside wall of container 10 may have extensions 12 at the bottom to support the apparatus as shown in FIG. 1 or other supporting means may be used, as, for example, stays or guy wires commonly used in supporting trees, telephone poles and the like. Any economical, effective supporting means may be used, of course, and such will be chosen with weather conditions of the locale in mind, as well as with the size and weight of the materials being used. Usually lightweight, weather durable materials are used. The elements of this invention which become in contact with or exposed to salt water or corrosive materials, such as supports 12, or lowermost screen 15 or membrane 24, are constructed of inert materials such as inert metals, concrete, or inert synthetic polymers such as poly (tetrafluoroethylene).

The bottommost part of container 10, designated as 13 in FIG. 1, is generally constructed of a poor conductor of heat such as concrete or a synthetic polymeric material. This supporting means, section 13 is perforated, as, for example, being slotted as indicated by the arrows 14 to allow the liquid to reach and contact the bottommost layer of pulverulent material A. This material is generally sand, and it rests on screen or porous element 15 which is usually a strong copper or the like screen or perforated plate having a mesh considerably smaller than the particle size of material A. Resting on top of layer A is a layer of particulate material B which has a greater ability to conduct heat than does A, for example, by being a mixture of sand and a powdered metal such as copper. Similarly, layer B is topped by an even better conductor C, which is in turn topped by a still better conductor D. These gradients can be effectively and economically gotten by simply lowering the amounts of sand and increasing the metal content as one goes from layer to layer, ending normally with layer E which contains but little sand and with layer F which is all pulverized metal. If desired, a screen element 15 may be placed on top of each layer and may be fixed to or supported by the inner walls of the column. Such placement prevents undesirable shifting of materials downwardly. Generally, a screen is positioned at the top of the uppermost layer (F) to prevent carryover of solids into side arm 16.

The very top of container 10 is sealed as at 17. Since solar energy is being used to effect the heating of the pulverulent materials inside container 10, heating element 18 may be provided at closure 17 to assist in keeping vapors that reach this area in the gaseous state. Element or vane 18 can be of any convenient size and shape and is generally constructed of metal such as aluminum or copper. One, of course, avoids the use of the rust-forming irons or of readily oxidizable metals.

The condensation section 16 of the still is generally made of a non-conductor, being, for example, a tube of poly(tetrafluoroethylene). It terminates in sealed relationship with receptacle 19, also made of a non-conductor and, if at a seashore, generally buried in the sand, deep enough to be surrounded by water as a further way of effecting temperature differentials and keeping the condensate cold. This is shown in FIG. 1 which also shows element 20 as an outlet for the condensate, pumping elements being omitted for convenience, outlet 20 also providing access to atmospheric pressure as a lower pressure than that which builds up within column 10.

From the above it will be understood that the sun's rays upon striking the outer walls of container 10 will heat them and that heat will be effectively conducted inwardly since the layers of particulate material are in contact with the inner surfaces of the walls. The inward flow of heat will be greater the greater the thermal conductivity of the given layer. Therefore, a temperature gradient is created within container 10, the temperature getting higher and higher as the approach to the section above layer F becomes shorter. Temperatures exceeding the boiling point of water may thus be reached. With the vaporization of water, whether by boiling or otherwise, the pressure within the container 10 exceeds atmospheric pressure so that a continuous sweep of vapor passes into condenser 16 to appear as liquid 21 in vessel 19 as indicated by arrow 22.

In addition to or instead of graded materials A to F inside the column, one may effect a thermal gradient by wrapping or covering element 10 with heat absorbent material outside. The absorbent material is made to increase in amount as shown by the shading in FIG. 2. This represents the use of an increasing amount or thickness of insulation material, such as fiber-glass or, alternatively, the covering material varies from section to section in the efficiency of the heat-absorbent material selected without the need of adding substantial weight. Thus, the lowermost section above the surface 11b of water-body 11a may be painted with a white paint with successively higher sections being painted with increasingly darker paints with the topmost being a black paint. Alternatively or additionally, the paints may contain increasing amounts of thermal-conducting materials such as pulverized metals such as aluminum, black nickel, zinc, copper, copper oxide and nickel oxide.

Similarly, the condenser 16 may be covered with heat-reflective materials such as aluminum wrap or paint with the reflective ability of the coating or wrapping material increasing in efficiency or quantity the closer the condensate gets to receptacle 19. In other words, as indicated at 28, the section of condensing arm 16 nearest column 10 will be the most heat retentive in order to minimize heat loss in the contiguous part of column 10 while the section of arm 16 nearest receptacle 19 will be the least heat retentive or the more reflective in order to get as much cooling of the condensate as possible.

While one may, of course, use mirrors or the like to concentrate rays of the sun on particular portions of element 10, the need for such is not necessary and is advantageously obviated by the principles of this invention. The various materials used in constructing and operating the still of this invention are readily available and inexpensive. No moving parts are employed in effecting the distillation. A continuous process is effected. Further, the materials are long lasting.

The container or column 10 may be entirely constructed of concrete or similar masonry and may be of any desired length and other dimensions. It need not be vertically positioned as in FIG. 1 but may be angularly positioned to achieve optimum insolation. The outlet tube 16 may extend upwardly over considerable distances to permit the collection of pure water remote and above the level of the impure water at 11a. Gravity flow from receptacle 19 is then possible to effect direct flow of water to people or to turbines or the like for energy conservations. Extensions of tube 16, will, of course, create heat-loss possibilities. Therefore, the principles of this invention are again applied to any such extensions. In other words sections or all of such an extension may be provided with the gradient-producing materials described for and in column 10 until the final outlet arm or tube is reached at which area the attainment of the above-described reverse gradient effects is provided for by use of said reflective elements.

While it is possible, as stated above, to associate column 10 and/or outlet tube 16 with reflectors, such as mirrors or polished sheets of such metals as aluminum or a chromium plated metal and to activate such so that they track the sun, it is preferred to minimize, and to avoid entirely the use of power other than that of the sun's rays. Thus, the principles of this invention may be applied in a supplementary manner to the dark side of the stationary column. One skilled in the art will determine quite accurately the area that receives no sun's rays. That area is then covered with, for example, a thermally conductive paint, such as an aluminum paint to a desired thickness or adhered to the outer surfaces in that area of column 10 are metallic sheets or strips 21 which extend into a portion of the area where the sun's rays are striking. Such metal elements can be mounted through the use of threaded studs and nuts, not shown for convenience, or are adhesively bonded to 10. In any event, this element, shown in FIG. 3, may be applied all along the dark side of column 10 with insulation 26 placed over the conductive materials used. The latter is generally used in increasing amounts going away from the bottom of the column but the insulating material is generally of uniform thickness though it may be thicker at the hotter areas. In some locations, as for example in hot desert regions, there may be no dark side due to the reflective surroundings. Then, of course, the above elements need not be used. The insulation may be made of asbestos, fiberglass, contained vermiculite, styrofoam, polyurethane and the like.

Similarly, the outlet arm 16 will have a dark side. Here again, those areas may be treated as above with the area of the dark side adjacent to receptacle 19 being not so treated, or being on all sides coated with or bearing a highly reflective material or being jacketed for the reception of cold water as in conventional distilling columns. Cooling water may be taken from receptacle 19 and returned. This arrangement is shown in elevation by lines 23. Water is pumped out of container 19 by pump P and is passed to condenser or jacket 23 from which it returns to container 19.

Prior to being sent to container 19, the hot vapors coming into outlet tube 16 may also be directed against a vessel containing a low boiling liquid, such as a hydrocarbon like isobutane or pentane or a halogenated hydrocarbon, such as monofluorotrichloromethane, to vaporize it, directing such vapors to run a turbine. The said hot vapors are then condensed and sent to receptacle 19.

The placement of receptacle 19 in a cold or relatively cold place, as underground and surrounded by water, is advantageous in that the receptacle itself acts as a condenser. The flow of vapor into it is under pressure and seeks the outlet 20. Since the inner walls of 19 are colder than the incoming vapor, condensation occurs. If desired, the ceiling of 19 and/or its walls may be slanted, and the exit orifice of outlet arm 16 may be so placed to jet the incoming vapor and/or condensate against such slanted inner surfaces to facilitate condensation.

In any event there is a pressure differential between outlet 20 and the entrance of the impure water into column 10. Sea water and bodies of impure water contain varying amounts of air. Thus, air is passing through the system along with the vapor of the liquid being purified, in this case, water. That flow may be increased by tapering column 10 with the smallest dimension of it near outlet arm 16 and by tapering the latter with the smallest dimension at receptacle 19. The outlet or vent 20 in container 19 may be similarly tapered. The velocity of the flow of gaseous material is generally commensurate with the condensation that is occurring so that flooding of column 10 usually does not occur.

A pressure differential in addition to that just described and to that occurring as a result of placing receptacle 19 high above column 10 as suggested in the FIG. 1 by broken lines 27, the drawing not being to scale, is created by placing a permeable membrane 24 on screen or porous element 15. This porous or permeable member may be made of any of a large number of materials cellulose acetate and any of many synthetic polymers in film form such as polyvinyl chloride, polypropylene, polyethylene, the polyurethanes, cellulose derivatives such as cellulose butyrate and nylon, the polyimides, tetrafluoroethylene polymers, and its copolymers, the poly (tetrafluoroethylenes), the poly(tetraethyleneterephthalate) polymers among others. Any of these also can be used as screen element 15. Screens 15 and membranes 24 are snugly fit or are bonded to the inner walls of column 10 so as to be in sealing relationship with those walls and in the case of the membranes to be in sealing relationship with the impure liquid material downstream and in feeding relationship therewith to pass said material upstream.

The concentration of the salt in sea water is generally low being about a few parts per million to about 3 to 4% and that of impotable water bodies, such as salt marshes, is also low. The semipermeable membrane 24 prevents the passage of the salts in the impotable water into column 10. In order to increase the flow of water through the membrane, a layer of rock salt 25 or other salts may be deposited initially on top of said membrane, or the bottommost layer A may be a mixture of salt and sand so that there is within column 10 at the bottom a salt solution greater in concentration than that in the water being purified. The use of such a gradient is advantageous in that a buildup of salt within the column is prevented.

This prevention is particularly important when capillary gradients are substantially relied upon. The capillary lifting of water by, for example, sand in layer A is greater than the capillary lifting of a layer of a particulate metal, as in layer F. Since an objective of this invention is to get pure water up into the upper sections of column 10, the capillary effectiveness of the layers can be increased by using pulverulent materials such as natural or synthetic zeolites, pumice, pulverized limestone or lava, other synthetic materials such as silica gel and porous polymers such as those named above. Organic capillary effective materials include cellulose materials such as cotton, wood pulp or sawdust and the like, charcoal, or peat moss. Such materials may be used alone or admixed into sand in layer A, and in successively decreasing amounts in the layers above, as in layer B and C. Generally, capillary activity is not needed in such layers as D and E, for there the evaporation of the liquid is occurring smoothly if solar energy is being used. In any event, the use of such capillary active materials does not require washing them out with salt free materials if membrane 24 is used. If the capillary gradient principle is not used, such washing is not needed either, because the capillary activity of sand and the sand mixtures is not great enough to cause salt buildup within the columns not only because of the lower effectiveness in pick-up of liquid but because of the constant flow into and out of column 10 of sea water at the bottom of column 10 through passageways 14.

The abovementioned capillary materials may be mixed with the thermal gradient mixtures described above in improving the efficiency of the column when solar power is low or absent. While the column 10 may be packed solely with capillary gradient material, it is preferred to use thermal gradient materials with them to increase flow rates.

By this invention a passive system is provided for converting impotable water from such sources as rivers, seas, oceans, swamps and the like to pure water. No moving parts are needed. There is no consumption of oil, natural gas, electricity or coal or the like. Further, the conversion may be effected without requiring the production of temperatures needed to boil water though such are attainable. Through the use of easily produced gradients a flow of air is made to occur. Thermal, capillary and pressure gradients are used cooperatively to separate a liquid, water or other liquids, from contaminants, to convert the liquid in so doing to a vapor, to cause that vapor to move through zones involving thermal gradients and to be condensed into pure liquid. The apparatus need not be positioned in the exact vertical but may be inclined or even used horizontally.

All of the materials used are inexpensive or of moderate expense and are readily available. For example, 50 gallon steel drums may be used by perforating the bottoms and stacking one upon the other to form sections A to F and welding or otherwise supporting the sections. These sections can be removably mounted or can be equipped with access doors for ready charging or recharging their contents. The materials used should be or made to be substantially resistant to the effects of salt water or hot water. The principles of this invention may also be applied to the recovery of or the purification of industrial water or other industrial wastes.

For example, organic solvents, such as acetone, benzene or toluene, may be recovered by use of the process and apparatus of this invention. Such organic materials may be separated from dissolved or suspended solid materials therein, such as catalysts and polymeric materials at the plant site so that they can be used immediately in subject plant processes. Also, by properly selecting screen 15 or permeable membrane 24 one may separate liquids from liquid. Use of a membrane permeable to benzene vapor but impermeable to water vapor, such as a film of a poly(tetrafluoroethylene) polymer, affords ready recovery of dry benzene. In effecting such separations by using solar energy and the principles of this invention one skilled in the art need only to select those pulverulent materials which are resistant to attack by the non-aqueous materials being processed.

The majority of the devices and methods of this invention are, of course, dependent upon solar energy, but this is but a universal obstacle of man. In this context, a great advantage of this invention is that the construction and operation of the equipment are so simple that virtually any man can build the apparatus and attend to its maintenance.

While the invention has been disclosed herein in connection with certain embodiments and certain structural or procedural details, it is clear that changes, modifications or equivalents can be used by those skilled in the art; accordingly, such changes within the principles of this invention are intended to be included within the scope of the claims below.

I claim:

1. Apparatus for the purification of an impure volatile liquid which apparatus comprises a distilling device comprising a column and a condenser;

in said column a capillary gradient comprising a column packing material varying in capillary activity, material of relatively low capillary activity being in closest position within said column to said impure liquid with capillary material of successively better capillary activity being above it to form said gradient with material having the best capillary activity near the outlet of said column to said condenser, said material being substantially unchanged by contact with said impure liquid; and said condenser comprising means to convert any vapors from said liquid to a purified state.

2. Apparatus in accordance with claim 1 in which said capillary active materials comprise naturally occurring organic materials.

3. Apparatus in accordance with claim 1 in which said capillary materials comprise naturally occurring inorganic materials.

* * * * *